United States Patent
Kawchitch

[15] 3,705,644
[45] Dec. 12, 1972

[54] CONVEYOR SCREW ELEMENT

[72] Inventor: Claude Edward Kawchitch, 1 Charles Street, Jolimont, Victoria, Australia

[22] Filed: Jan. 22, 1971

[21] Appl. No.: 108,805

[30] Foreign Application Priority Data

Jan. 23, 1970 Australia.................PA 0155/70

[52] U.S. Cl..................................198/213
[51] Int. Cl..................................B65g 33/00
[58] Field of Search..............198/213–217; 64/23, 23.5

[56] References Cited

UNITED STATES PATENTS 2,650,460    9/1953    Newhouse.................198/213
2,885,231    5/1959    Smith.........................64/23.5
3,236,173    2/1966    Wohleb......................198/213

FOREIGN PATENTS OR APPLICATIONS 347,519    1/1922    Germany....................198/213

Primary Examiner—Richard E. Aegerter
Attorney—Waters, Roditi, Schwartz & Nissen

[57] ABSTRACT

Conveyor screw elements having molded flight portions of relatively short lengths and integrally molded hollow, longitudinally grooved hubs adapted to be mounted on a shaft having longitudinally extending splines. Each of the screw elements is adapted to be angularly offset relative to adjacent ones on the shaft.

2 Claims, 5 Drawing Figures

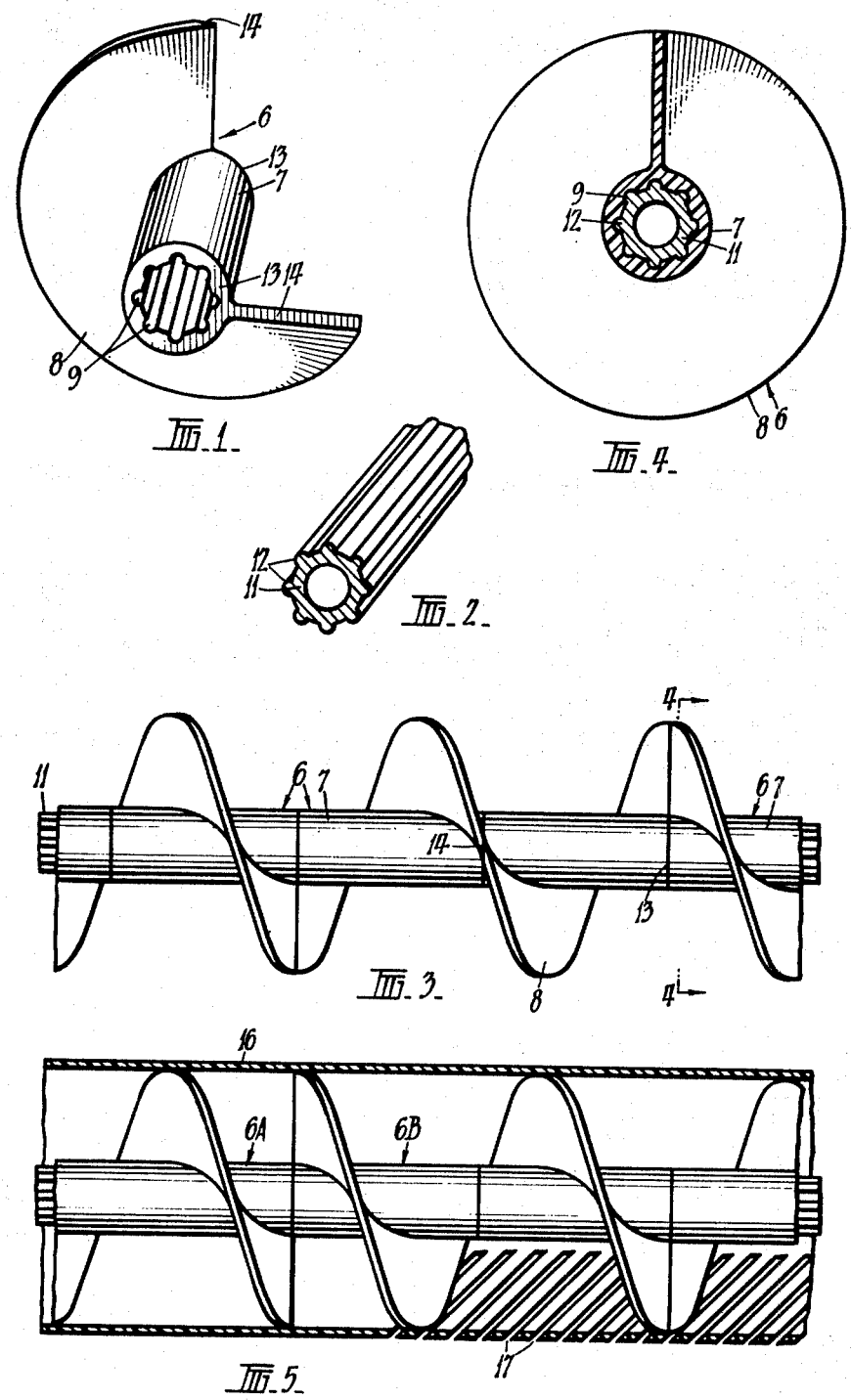

CONVEYOR SCREW ELEMENT

This invention relates to screw elements for screw conveyors.

Screw conveyors operating within a tube are widely used for means of transporting discrete materials along the tube. Such conveyors are frequently required to operate over long lengths up to several hundred feet. Hitherto the only practical means of constructing screws for such conveyors has been to fabricate the screw by welding a helical flight section to a central hub. This method of construction is costly and cumbersome and can only be satisfactorily employed where the materials of the flights and the hub are weldable materials such as steel. It will also be apparent that each screw must be individually made for its particular conveyor and the characteristics of the screw must be predetermined according to the requirements of installation and the screw fabricated to produce those characteristics.

The present invention provides a conveyor screw construction which is versatile and flexible in its application, which can provide a smooth continuous integral structure between the flight and the hub and which can be produced using mouldable components. Moreover, the construction may be such that the length and characteristics of the screw may be readily varied.

It is proposed according to this invention to produce conveyor screw elements having moulded flight portions of relatively short length which may be joined together to form a screw of the desired length by mounting the screw elements on a shaft. More particularly, the invention provides a conveyor screw comprising a shaft, a plurality of screw sections which each have a hub portion and a spiral flight portion integrally moulded together and which are mounted on the shaft in end to end relationship, and cooperating means on the shaft and the screw sections rotatably to couple the screw sections to the shaft.

In order that the invention may be more fully explained, a practical embodiment will now be described with reference to the accompanying drawing in which:

FIG. 1 is a perspective view of one conveyor screw section;

FIG. 2 shows part of a hollow splined shaft on which to mount the conveyor screw section;

FIG. 3 is a perspective view showing a series of conveyor screw sections mounted on the shaft to form a continuous conveyor screw;

FIG. 4 is a cross-section on the line 4—4 in FIG. 3; and

FIG. 5 shows the conveyor screw disposed within an enclosing tube and the manner in which its screw sections can be rotationally adjusted relative to one another to vary the characteristics of the conveyor.

The conveyor screw section illustrated in FIG. 1 is denoted generally as 6. It comprises a tubular hub portion 7 and a spiral flight portion 8 which are moulded integrally together. The whole of the section 6 may be moulded in one piece from a tough plastics material such as nylon.

The spiral of flight portion 8 conforms to a regular helix and the length of the section 6 is equal to about three quarters of one pitch of the helix.

The interior of the hub portion 7 has a plurality of longitudinally extending grooves 9 arranged circumferentially at equal spacing around the hub so that the hub can be slid onto an externally splined shaft 11. Shaft 11, which may conveniently be a hollow aluminum shaft, has longitudinally extending circumferentially spaced splines 12 to suit the grooves 9 so that the hub 7 will slide onto the shaft but will be rotationally coupled to it. There are eight splines so that section 6 can be mounted on the shaft in any of eight rotational positions at 45° increments.

As seen in FIG. 3 a series of identical screw sections 6 can be fitted to the splined shaft 11 in end to end relation to form a continuous conveyor screw. The flat ends 13 of the hub portions 7 lie in planes perpendicular to the axis of the hub portions and abut to form a continuous and substantially smooth hub. The ends 14 of the flight portions 8 are chamfered to lie in the same planes as the ends 13 so that the flight is also substantially smooth and continuous across the joints between adjacent screw sections.

A conveyor screw of any desired length can be assembled simply by sliding the requisite number of pre-moulded screw sections 6 onto a shaft of appropriate length. If the screw is to be longer than a convenient shaft length the shaft itself may be extended by merely adding a further shaft length with the two lengths of shaft connected by means of an internal pin. Thus a screw of any desired length which is a multiple of the length of a screw section can be built up merely by assembling the pre-moulded sections onto a shaft. It will, of course, be appreciated that lengths which are not exact multiples of a section length can be made up merely by cutting to size the last screw section in the assembly.

FIG. 5 shows the conveyor screw disposed within an enclosing tube 16 which can be of metal or a plastics material. As shown, the bottom of tube 16 may be cut by a series of drainage slits 17. Slits 17 are cut in parallel planes which are disposed at an acute angle to the axis of the tube 16. Thus the portions 18 of the tube 16 between the slits 17 serve as part-elliptical ribs which can move under the influence of downward pressure on the tube wall such that the slits 17 will tend to open. Thus build-up of high pressures within the tube due to inadequate drainage is prevented.

FIG. 5 also illustrates how the characteristics of the conveyor may be altered by adjusting the angular positions of the screw sections 6 relative to one another. In this case one of the screw sections 6A has been arranged rotationally relative to the adjacent section 6B such that the adjacent ends of the flight portions of those two sections are displaced from one another through 180° instead of being in abutment. In this manner there is provided a lag in the conveyor and the exposed flight end of the screw section 6B will provide a chopping action. Thus by providing a staggered relationship for one or a number of screw sections or by having them arranged in smooth abutment the characteristics of the conveyor can readily be varied.

The length of the screw section may be any suitable length to provide the necessary multiples for the construction of a screw. Where the section is to be moulded in plastic, however, it has been found that it is convenient for moulding purposes to have a length which is somewhat less than that of a complete pitch of the flight. Such a section can be produced in a relatively simple mould without the need for complicated mould stripping arrangements. On the other hand, of course, it will be appreciated that there may be special circumstances in which the convenience of assembly may make it desirable to produce a screw section of one pitch length or even longer.

I claim:

1. A screw conveyor comprising a tube and a screw mounted for rotation within the tube, wherein said conveyor screw comprises a shaft; a plurality of screw sections mounted on the shaft in end to end relationship, each screw section being molded as a unitary structure in a plastics materials and comprising a generally cylindrical hub portion which receives said shaft and a spiral flight portion extending around the hub portion to run neatly within the tube; and formed on the external periphery of the shaft and the internal periphery of said hub portions of the screw sections, spline and groove means coupling the screw sections to the shaft, said spline and groove means including at least eight splines with cooperating grooves extending longitudinally of the shaft and the hub portions of the screw sections and spaced at equal intervals circumferentially thereof so that each screw section can be coupled to the shaft in any of at least eight rotational positions relative to one shaft, the rotational positions of the screw sections adapted to be varied relative to one another to vary the characteristics of the screw, and said flight portion of each section being spiraled to a regular helix and the length of the section being less than the pitch of said helix so that the flight portion extends through less than one complete turn of the helix whereby molding of the screw section is facilitated.

2. A screw conveyor as claimed in claim 1, wherein an underside of said tube is broken by a series of slits disposed in planes which are parallel with one another and subtend an acute angle of about 45° to the axis of the tube so as to be inclined downwardly and backwardly relative to the direction of forward feed on rotation of the screw.

* * * * *